Patented Sept. 28, 1948

2,450,055

UNITED STATES PATENT OFFICE 2,450,055

FOOD COMPOSITION CONTAINING FUSARIA

Friedrich F. Nord, New York, N. Y.

No Drawing. Application January 6, 1945, Serial No. 571,694

6 Claims. (Cl. 99—2)

The invention relates to a new food composition to be used much in the same manner and for the same purposes as the well known yeast products.

Attempts have been made heretofore to use some molds of the genera Aspergillus, Penicillium, and related kinds for the production of fats. These experiments had no practical consequences, and the genera mentioned above were never used as sources of other food constituents.

The principal object of my invention is to provide a novel food composition from molds which contains valuable nutritious and fortifying ingredients. A further object of the invention is to provide a very economic method of preparing a new mold-containing composition for nutritional and medicinal purposes. Other objects and advantages of the invention will be apparent hereafter.

I have found that molds of the genus Fusarium have a composition which renders them suitable as a good food basis. Their mycelia contain not only fats, but proteins and vitamins, particularly members of the vitamin B complex such as thiamin. They have a pleasant stimulating odor which makes them readily acceptable as food and overcomes the difficulties and objections raised against yeast in a vitamin diet. A further advantage of Fusaria preparations is that they can be fed in larger amounts or proportions than yeast compositions.

It is well known that brewer's yeast at a 10 per cent level in a purified diet supports good growth, reproduction, and lactation in mice. Fusaria adequately replace brewer's yeast in the synthetic ration and supply the necessary B complex vitamins, protein and fat. The following tests are illustrative of the favorable results obtained by the novel food composition according to the invention.

Example 1

A strain of *Fusarium lini* Bolley (F1B) was grown on an artificial stock culture medium consisting of glucose, potassium nitrate, primary potassium phosphate, and magnesium sulfate. After a growth period of three weeks, the mats were removed, washed with water, air dried, and ground up into a powder. This powder was incorporated into a diet as follows:

| | Per cent |
|---|---|
| Purified casein (Smaco) | 25 |
| Sucrose | 45 |
| Salts (Osborne and Mendel) | 5 |
| *Fusarium lini* Bolley (F1B) | 10 |
| Crisco | 7 |
| Lard | 5 |
| Cod liver oil | 3 |
| | 100 |

As the purpose of these experiments was to determine the possible effect of the members of the vitamin B complex present in Fusaria, the fat soluble vitamins in the diet were liberally supplied by the lard (linoleic acid), Crisco (vitamin E), and cod liver oil (vitamins A and D).

Eleven weanling mice of two kinds, viz. albino and Rockland black strains, were placed on the diet, which proved to be excellent for growth in both strains of mice over a period of 30 to 35 days. The growth during this period was superior to that obtained with diets containing 10% brewer's yeast. The food intake averaged 3 to 3.5 grams daily. After the first month on this diet, however, growth fell off and an actual loss in weight occurred. The daily food intake dropped to 1 to 1.5 grams. Since a similar loss in appetite had been observed in experiments on thiamin deficiency, a small supplement of $B_1$ (10 micrograms daily) was either injected or fed. An immediate resumption of growth occurred and the food intake was tripled over night. This effect of vitamin $B_1$ is intelligible since F1B contained about 20 micrograms of the vitamin per gram of dried material or approximately 2 micrograms per gram of diet. An effect comparable to the injection of vitamin $B_1$ was obtained when the amount of F1B in the diet was doubled. Such an increase of the F1B proportion in the diet was readily accepted.

Example 2

In order to study the effect of Fusaria during lactation, three female mice raised on the same diet as described in Example 1 (above) were mated when 75 days old. They were given daily supplements of 100 micrograms of vitamin $B_1$. Gestation and lactation were normal for the three mice. This result proves that a diet containing sufficient Fusaria as a source of the B complex vitamin is an excellent diet for mice through growth reproduction and lactation. The vitamin content of the Fusaria may be enhanced if the mold is grown on a more complete culture medium. The thiamin content can be, of course, increased by adding vitamin $B_1$ to the culture medium.

*Example 3*

A ration was prepared in which F1B supplied, in addition to the B complex vitamin, the sole protein of the diet. This diet consisted of 40% F1B, 40% sucrose, 5% salts, 10% Crisco, and 5% lard, and was supplemented with vitamin A and D concentrate (4 micrograms per 100 grams of the diet). The level of protein in the diet was about 15% on the basis that the percentage of protein in F1B was approximately 37% as contrasted with 45% protein in brewer's yeast. Six mice fed on this ration grew satisfactorily and compared favorably with those on a highly purified ration that contained 15% casein.

This example proved the adequacy of the protein present in F1B for feeding purposes. The growth of mice was even better when the level of F1B in the diet was raised since the 15% protein was supplying just the minimal quantities of the essential amino acids.

There are Fusaria species, e. g. *Fusarium graminearum* Schwabe, which contain less B complex vitamin than *Fusarium lini* Bolley. If mycelia of such a Fusarium are used in food compositions, the vitamin deficiency must be made up by addition of adequate quantities of members of the B complex family.

The culture of Fusaria is by far more simple and economic than the preparation of yeast. The Fusaria may be readily grown, for instance, in the course of the alcoholic fermentation of pentoses and hexoses. Wastes of wood hydrolysis and sulfite waste liquors contain abundant quantities of these carbohydrates and constitute, therefore, excellent culture media. The mats are removed from the culture medium and dried. The dried mycelia may be ground to a powder which may be mixed with other food constituents, preferably with carbohydrates in order to balance the high protein content of Fusaria. *Fusarium lini* Bolley is particularly suited for this purpose because it has over other Fusaria species the advantage of growing in coherent mats, which can be readily removed and separated as a whole from the culture medium.

Various changes in the composition of the food products and in the procedure described herein may be made without departing from the scope of the invention as defined in the appended claims.

I claim:

1. A basal food composition consisting essentially of *Fusarium lini* Bolley as a protein and B-complex vitamin supplying ingredient, in admixture with other nutritional constituents.

2. A basal food composition consisting essentially of not less than 10 percent *Fusarium lini* Bolley as a protein and B-complex vitamin supplying ingredient, in admixture with other nutritional constituents.

3. A basal food composition consisting essentially of 10 to 40 percent *Fusarium lini* Bolley as a protein and B-complex vitamin supplying ingredient, in admixture with other nutritional constituents.

4. A method of compounding a basal food composition which comprises mixing *Fusarium lini* Bolley as a protein and B-complex vitamin supplying ingredient, with other nutritional constituents.

5. A method of compounding a basal food composition which comprises mixing *Fusarium lini* Bolley, in an amount not less than 10 percent, as a protein and B-complex vitamin supplying ingredient, with other food constituents.

6. A method of compounding a basal food composition which comprises mixing *Fusarium lini* Bolley, in an amount from 10 to 40 percent, as a protein and B-complex vitamin supplying ingredient, with other food constituents.

FRIEDRICH F. NORD.

REFERENCES CITED

The following references are of record in the file of this patent:

UNITED STATES PATENTS

| Number | Name | Date |
|---|---|---|
| 2,346,011 | Damm | Apr. 4, 1944 |

OTHER REFERENCES

Chemical Abstracts 29: 1458[7]; Wilt of Flax, Helene Grossmann; Phytopath Z. 7,545–83 (1934).

Chemical Abstracts 37: 5995[6]; A new biochemical fat synthesis, H. Damm.; Chem. Ztg. 67, 47–9; 1943.

Chemical Abstracts 36: 5202[8]; Occurrence of vitamins in fungi, Carpenter and Friedlander; Science 95,625 (1942).

Chemical Abstracts 34: 4855[9]; Problems in fermentation of pentoses, Dietrich and Klammerth.

Chemical Abstracts 37: 404[4]; Essential steps in the enzymic breakdown of hexoses and pentoses. Interaction between dehydrogenation and fermentation, Wirth and Nord; Arch. Biochem 1, 143–63.

Phytopathologische Zeitschrift, Bd. VII, Untersuchungen uber Welkekrankheit Flasches, von Helene Grossmann, St. Gallen-Sonderabdruck Aus. (1934).